Nov. 10, 1931.   W. H. MANNS   1,831,631
EQUALIZING MECHANISM
Filed Oct. 1, 1929
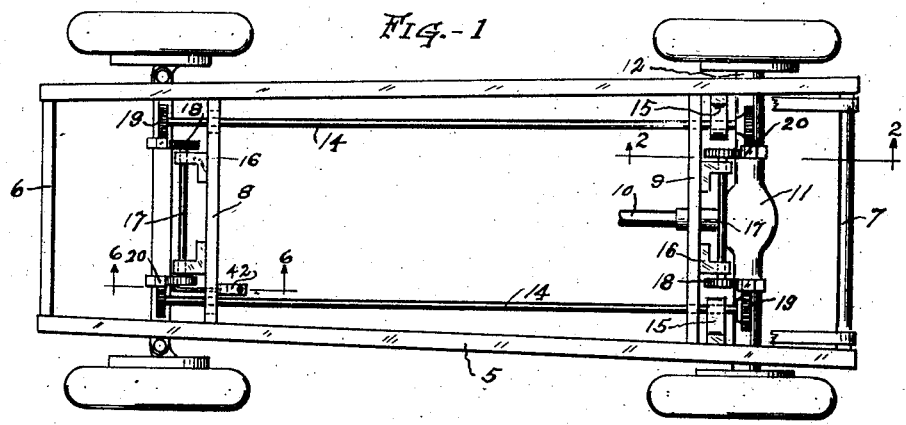
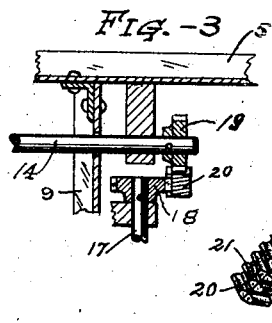
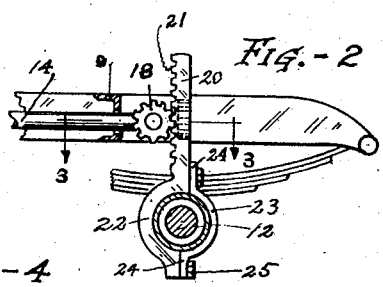
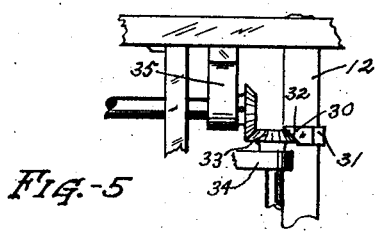
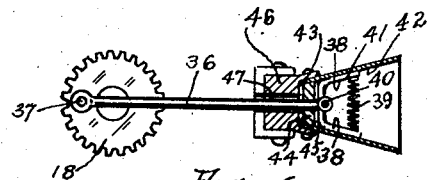
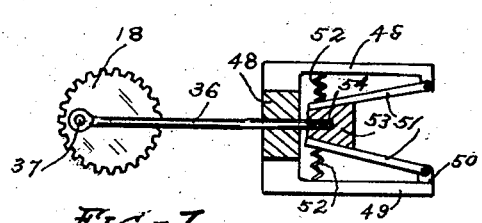
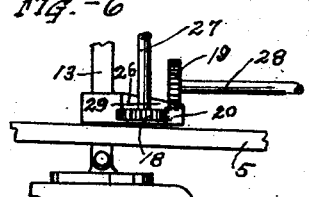
Inventor
Walter H. Manns
By Frank D. Gray
Attorney Patented Nov. 10, 1931

1,831,631

UNITED STATES PATENT OFFICE

WALTER H. MANNS, OF ROCKY RIVER, OHIO

EQUALIZING MECHANISM

Application filed October 1, 1929. Serial No. 396,438.

My invention relates to equalizing mechanism, particularly for use in automobile structure and for use in operation therewith to equalize and distribute the force of shock encountered by the auto frame when, as often happens in speedy and uneven travel of the vehicle over the route, a part only of the vehicle supports receives the shock directly from a centrally-located area, the force of momentum receiving and yielding quite unpleasantly to the shock which it is less able to resist, while the first area met, merely transmits the force of the shock to the occupants of the vehicle.

It is an object of my invention to connect the ultimate supports of a vehicle, such as the axle or a part carried thereon, with the base frame for the body, by gear mechanism, one part being movable and the other or others relatively immovable with the stationary part, the gears of the mechanism being geared together by shafts whereby the shock resulting from sudden lowering of a part of the frame will be divided, and distributed over the frame area.

It is a further object of my invention to provide certain vertical racks mounted directly upon a fixed portion of an auto truck, usually the axle or a bracket extending from the axle, the racks extending upwardly by choice from such axle or bracket, to which gears secured to rotating shafts are held in mesh, are positioned at the corners of the vehicle frame, and each rack is made to mesh with two gears, on rotary shafts at right angles to each other. This results in the lowering of a portion of the frame carrying certain of the gears and at least one of the shafts, causing a similar depression of other portions of the vehicle frame, by reason of the driving of the distant gears upon the farther racks, which latter are fixed to the axle as above explained.

A still further object of my improved mechanism is the provision of a travelling block arranged to slide within friction parts by means of a link pivotally connected with one of the equalizing gears, for the purpose of increasing certain friction effects and therefore avoid too sudden and easy movement of the gears upon the racks.

While the illustrated arrangement and the description thereof will make clear the general operation of my improved mechanism, it is to be understood that my invention is by no means limited to the detailed mounting of the several parts as shown, but that the same inventive idea may be expressed by other relative arrangements as will be understood.

Reference is made in my description to the following drawings in which—

Figure 1 is a plan view of the under portion of a vehicle upon which my mechanism is mounted with certain parts broken away;

Figure 2 is a transverse section taken in the plane indicated by the line 2—2 of Fig. 1;

Figure 3 is a transverse section taken in the plane indicated by the line 3—3 of Fig. 2;

Figure 4 is a perspective view of a portion of a rack having a polygonal outline;

Figure 5 is a plan view of a modified form of enmeshed gears one of which engages a rack having a beveled face, and various portions broken away;

Figure 6 is a vertical section of the friction device shown in the plane indicated by the line 6—6 of Fig. 1;

Figure 7 is a view of a modified construction of the mechanism shown in Fig. 6, and Figure 8 is a plan view showing a modified form of mounting a pair of gears and a rack upon the end of a front axle, other parts being broken away.

Referring to my improved structure, and assuming a conventional type of supporting frame comprising the usual sills 5 and the front and rear cross bars 6 and 7, respectively, it is quite practicable to connect the sills by the cross plates 8 and 9, and mount upon the latter the usual drive shaft 10 leading to the gear casing 11 from which the rear axle 12 may be driven in the conventional way. The forward axle 13 is mounted in a plane below the sills 5 as usual, and will have the ordinary connection with suitable steering mechanism, the details of this not being illustrated nor described, and no claim made to any part thereof. As shown in Fig. 1, substantially parallel rotary shafts 14 are mounted just inside the sills in bearings beneath the plates 8 and 9 and in brackets 15 secured to the inner surface of the sills.

Other lugs 16 are provided on the outer surface of the cross plates 8 and 9, and cross shafts 17 having bearings in these lugs 16, there being gears 19 fixed on the ends of the shafts 14, and gears 18 fixed on the ends of the shafts 17.

As shown in Figs. 1 to 4 and 8, perpendicular posts 20 are provided each somewhat adjacent one of the vehicle wheels, but inside the sills 5, and mounted fixedly upon some portion of the frame or of the rigid parts connected therewith. These posts 20 are substantially polygonal in cross section and affording two rack surfaces 21 which extend vertically and at right angles to each other. As shown in Fig. 1, the rack member 20 is geared to the shaft gears 18 and 19, at each corner of the vehicle, such relation being shown clearly in the horizontal section of Fig. 3. This meshing of the gears with the racks, results in the shafts 14 and 17 rotating in unison, and thereby the force of the weight of one corner of the vehicle compelling any one pair of the gears 18 and 19, as they descend while in mesh with a rack 20, to cause the other corners of the vehicle to similarly descend as their gears travel down their corresponding racks, under the force applied by the corresponding shafts 14 and 17.

A very convenient and practicable form of mounting the racks 20 in a fixed vertical position is shown in Fig. 2, in which the lower end of the rack or post 20 is secured to the rear axle 12 by curving the said end 22 about the axle, and securing the same thereon by the provision of a metal loop 23 whose ends 24 are secured to the end 22 by bolts or other fasteners 25 which may detachably connect the rack 20 to the axle. If it is desired, the racks 20 may rock slightly upon the axle, but they will always be held by suitable fastenings in mesh with the gears on the shafts 14 and 17. As shown in Figs. 1, 2 and 3, the racks 20 will be mounted directly above the adjacent axle, but in Fig. 8, I have shown a relation of parts in which a cross shaft 27 parallel to the front axle 13 is provided with the gear 18, but the corresponding shaft 28 bears its gear 19 far to the rear of the axle and to the rear of the shaft 27.

The construction shown in Fig. 8 includes a rearwardly extending bracket 26 mounted upon the axle 13 just within the sill 5, and having the rack member 20 fixedly mounted upon the rearwardly extending portion 29 of such bracket, and the gears 18 and 19 meshing with the front and inner surfaces, respectively, 21, whereby the shafts 27 and 28 may rise and fall relative to the rack member as in the other forms, though the extension 29 of the bracket 26 is somewhat lower than the axle 13, and thereby permits a lower position of the vehicle body without striking the axle. It will be noted that the position of the racks is directly above the axle in the first three views.

A further modification of my improved mechanism for distributing the weight and shock over a greater area by means of a series of gears and racks, is shown in Fig. 5 as a pair of beveled gears fixed upon the ends of shafts corresponding to shafts 14 and 17 of the other forms, and a rack 30 fixed by means of a bracket 31 in vertical position above the rear axle 12, the latter rack having a bevel surface 32 meshing with the gear 33 directly, for positive connection with the said pair of gears. Brackets 34 and 35 serve to mount such gearing upon the sills and cross bar, as in the other form.

In the use of my mechanism, it is desirable to increase to some extent the friction opposing the vertical movement of the gears 18 and 19 along the racks 20, or of the gears 33 upon the rack 30, and for this purpose I provide a retarding device operating in conjunction with one or more of the gears which engage the racks. Examples of such devices are shown in Figs. 6 and 7 about to be described. In Figs. 1 and 6, a link 36 is pivoted to the gear 18 at 37 to serve substantially in a crank movement, the opposite end of the link having angle bars 38 pivoted thereto for opening and closing movement a compression spring 39 normally resisting the closing of such angle bars.

The L-bars 38 are pivoted together at 40, as shown in Fig. 6, the same pivotal connection serving to attach the link 36 to the L's whereby the movement of the links will reciprocate the outwardly pressed ends 41 within the inner surface of the inclined bars 42 whose outer ends gradually separate to form an opening therebetween, and whose inner ends 43 are fixedly attached to the edges of a cross bar 44 and to outer extension 45 of a block 46 suitably mounted upon a cross bar 8 of the machine frame, and apertured at 47 to permit movement of the links 36 therethrough, so that rotation of the gear 18 will reciprocate the L-members 38 with more or less friction by engagement with the bars 42.

In the structure shown in Fig. 7, a similar apertured block 48 receives movement of the link 36 through it, and has outwardly extending arms 49 substantially parallel with each other, the outer ends having inwardly bent tips 50 to which inwardly extending members 51 are pivoted, the inner ends being normally pressed toward each other by compression springs 52. In this construction, the end of the link 36 opposite the gear is secured to a wedge-shaped block 53, preferably by a screw connection 54, so that rotation of the gear 18 reciprocates the block 53 between the members 51, forcing the latter apart against the springs 52 as the block moves inwardly, this necessarily retarding the rotation of the gear mechanism by friction between the block and the members 51.

It is evident that the lowering of the vehicle body relative to the frame 5—6—7 will operate coordinately, since the descent of the gears 18 and 19 at any corner of the frame will, by engagement with the fixed rack 20, rotate the shafts 14 and 17 and thereby rotate corresponding gears at other corners of the frame, thereby forcing the descent of different portions of the vehicle body equally, which is the object desired.

Even though the advantage of equalizing the descent of the body of the vehicle relative to the fixed portions thereof, and distributing the force of shock encountered over the area of the vehicle frame is attained by the disclosed gearing mechanism, this mechanism may not fully overcome the sudden relative movement of parts when some obstacle is encountered, since the gears may, if their bearings are well lubricated, travel readily in mesh with the racks. To meet this condition, the retard devices illustrated in Figs. 6 and 7 are provided, to limit the relative movement of the gears too easily. The use of the retarding devices is, therefore, quite closely related to the equalizing mechanism illustrated in the other views.

It is evident that beveled gears may be substituted for the gears shown in Figs. 1, 2, 3 and 8, or the racks may be of the form shown in Fig. 4 or like that illustrated in Fig. 5, when used in conjunction with the beveled gears.

I have therefore provided a practical equalizing mechanism for operation between a fixed foundation, represented in these views by vehicle axles and their supports, and the frame of the supported structure, shown in these views as parts 5—6—7 and the load carried thereby. It is to be noted that while I have illustrated the operation of my improved mechanism as applied to a vehicle, it may be readily used between any foundation and structure movable relative to the foundation, but not normally equalized at different portions of the foundation. Applicant does not consider that his invention is limited to vehicle application.

Having thus described my invention I claim as new and desire to secure by Letters Patent the following:—

1. Equalizing mechanism for distributing the force of shock encountered by the frame of an auto vehicle movable relative to the axles of the vehicle, comprising vertical racks fixedly mounted at spaced points relative to said axles, gears mounted rotatively on said movable frame certain of said gears being in engagement with the said racks, and shafts mounted for rotation in said vehicle frame and carrying the said gears fixedly on the shaft ends.

2. Equalizing mechanism for evenly distributing over its area the force of shock encountered by the main frame of a vehicle movable vertically relative to its axles, comprising racks having one end fixedly secured at spaced points upon said axles, gears mounted on said movable frame and in engagement with the said racks, and a pair of longitudinal and of transverse shafts all mounted for rotation in said frame and each carrying fixed upon its ends a pair of said gears to cause unitary rotation thereof, so that the several points of said frame will move evenly toward and from the axles.

3. Equalizing mechanism for distributing the resulting yielding movement of the frame of a vehicle relative to its axles, comprising vertical racks mounted adjacent the axles and spaced apart, the lower ends of the racks being fixedly connected to the axles spaced from their ends lateral shafts mounted rotatively in the vehicle frame and carrying on their ends gears meshing with said racks, and transverse shafts mounted in said frame substantially parallel with the axles and carrying on their ends transmission gears meshing with said racks, so that the said frame will have a vertical movement toward and from the axles evenly distributed over its entire area.

4. Equalizing mechanism for evenly distributing over the area of a vehicle frame the shock resulting in the movement of said frame relative to the axles of the vehicle, comprising vertical racks fixedly secured at their lower ends to said axles at separated points, shafts mounted for rotation in said frame, certain of said shafts being substantially longitudinal and others transverse of said frame, and each carrying a plurality of transmission gears, certain of said gears engaging the said racks to cause unitary rotation of both the longitudinal and transverse shafts as the frame moves relative to the racks and axles, and friction retarding means for certain of said gears carried by said frame.

5. Equalizing mechanism connecting a stationary foundation at spaced points with a relatively movable support frame yieldingly carried thereby, comprising gearing mechanism including rotary elements on the frame and fixed elements carried by the foundation to distribute the relative movement of the rotary elements and fixed elements over the said points of connection, and friction retarding means for said mechanism carried by said frame.

6. Equalizing mechanism connecting a stationary foundation with a relatively movable support frame, comprising spaced racks mounted on said foundation engaged by transmission gears and rotary shafts carried by the frame and secured to certain of said gears to produce unitary rotation, and retarding means for certain of said gears including a sliding block element having spring-pressed connection with a fixed part of said frame and an actuating link pivoted at one end to one of said gears and detachably connected at the other end to said block element.

7. Equalizing mechanism for evenly distributing over the area of a vehicle frame the shock resulting in the movement of said frame relative to the axles of the vehicle, comprising vertical racks polygonal in cross section and bearing gear teeth on the plurality of surfaces, fixedly secured to said axles at separated points, spaced shafts mounted in said frame adjacent the sills and transverse shafts similarly mounted adjacent the axles, transmission gears fixedly mounted on the ends of said shafts, and a pair of said gears on a shaft longitudinal of and one transverse of said frame, respectively, engaging different gear surfaces of each rack.

8. Equalizing mechanism connecting a stationary foundation with a relatively movable support frame, comprising vertical racks polygonal in cross section mounted on said foundation in spaced relation and bearing gear teeth on a plurality of surfaces, having their lower ends fixedly secured to said foundation and the racks extending upward toward and beyond said frame, and gearing units rotatively mounted upon said frame and in engagement with the upper portions of said racks for connecting together the several points of the foundation bearing the said spaced racks, so that the said support frame will have a vertical movement toward and from the foundation due to engagement of said units with said racks, evenly distributed over its entire area.

In witness whereof I have hereunto set my hand this 27th day of September, A. D. 1929.

WALTER H. MANNS.